United States Patent Office 2,838,514
Patented June 10, 1958

2,838,514
PROCESS OF PREPARING 4-ARYLMETHYL-QUINOLINES

Alexander R. Surrey, Albany, and Royal A. Cutler, West Sand Lake, N. Y., assignors to Sterling Drug Inc., New York, N. Y., a corporation of Delaware No Drawing. Application July 1, 1955
Serial No. 519,675

1 Claim. (Cl. 260—283)

This invention relates to a novel process of preparing 4-arylmethylquinolines and to a particular group of 4-arylmethylquinolines prepared thereby.

This invention is a continuation-in-part of our copending application Serial No. 231,672, filed June 24, 1951, which was a continuation of our application Serial No. 29,937, filed May 28, 1948, now U. S. Patent 2,568,778, issued September 25, 1951.

Our invention provides a method of preparing a 4-arylmethylquinoline of the general formula $ACH_2Q$, where A is a monocyclic radical of the benzene series and Q is a 4-quinolyl radical, which comprises heating an alpha-aryl-alpha-(4-quinolyl)acetonitrile of the formula $ACH(Q)CN$ in an acidic medium. Thus, our process involves complete removal of the CN group of the alpha-aryl-alpha-(4-quinolyl)acetonitrile, the removal presumably taking place in two steps, namely: the hydrolysis of the nitrile group to a carboxyl group, and the elimination of carbon dioxide from the resulting alpha-aryl-alpha-(4-quinolyl)acetic acid.

The intermediate alpha-aryl-alpha-(4-quinolyl)acetonitriles are disclosed and claimed in our U. S. Patent 2,519,411, issued August 22, 1950. The aryl radical of these nitriles, designated as A, is preferably a monocyclic aryl radical of the benzene series. Thus, the aryl radical can be the unsubstituted phenyl radical or phenyl radicals substituted by from one to three substituents, such substituents including hydroxyl; alkoxyl such as methoxyl, ethoxyl, etc.; dialkylamino such as dimethylamino; halogen, such as chloro, bromo, or iodo; lower alkyl such as methyl, ethyl, butyl, etc.; nitro; and other groups which the chemist appreciates will be unaffected by the reaction conditions used in the preparation of the intermediate nitriles and in the process of our instant invention. Furthermore, said substituents can be in any of the available positions of the phenyl nucleus, and where more than one, can be the same or different and can be in any of the various position combinations relative to each other. The 4-quinolyl radical, designated as Q, as used in the specification and in the appended process claims in generic and includes the unsubstituted 4-quinolyl radical and 4-quinolyl radicals wherein the quinoline nucleus may be substituted by one or more, preferably one to three, of such substituents as: halo, including chloro, bromo, iodo and fluoro; lower alkyl, including methyl, ethyl, propyl, amyl, and the like; hydroxy; lower alkoxy, including methoxy, ethoxy, propoxy, and the like; aryloxy, such as phenoxy; aralkoxy, such as benzyloxy; trihaloalkyl, such as trifluoromethyl; nitro; amino; substituted-amino, such as acetylamino, ethylamino, dimethylamino, benzylamino, and the like; and other substituents. Furthermore, said quinoline substituents can be in any of the available positions of the quinoline nucleus, and where more than one, can be the same or different and can be in any of the various position combinations relative to each other.

Our process provides a means of obtaining excellent yields of said 4-arylmethylquinolines ($ACH_2Q$). The process can be carried out under various conditions: e. g., by refluxing the appropriate alpha-aryl-alpha-(4-quinolyl)acetonitrile with about 60% aqueous sulfuric acid for about one hour; or by refluxing the nitrile with concentrated sulfuric acid in ethanol for about twenty-two hours; or by refluxing the nitrile in absolute ethanol for about eight hours while passing dry hydrogen chloride through the solution. Essentially, our process involves heating an alpha-aryl-alpha-(4-quinolyl)acetonitrile in an acidic medium. In general, it is preferred to heat the nitrile at about 75°–150° C. with an excess over the stoichiometric amount of a strong mineral acid, and optionally, in the presence of an inert diluent such as water, a lower alkanol, a hydrocarbon, a halohydrocarbon, or a lower fatty acid. As a specific illustration of our process, heating alpha-phenyl-alpha-(4-quinolyl)acetonitrile in an acidic medium results in a quantitative yield of 4-benzylquinoline. This compound, 4-benzylquinoline, has been reported in the literature, however, the methods of preparing it have been far from being satisfactory. It was first prepared by Rabe and Pasternack [Ber. 46, 1029 (1913)], who isolated it as a by-product from the action of benzylmagnesium chloride on 4-cyanoquinoline. Bergman and Rosenthal [J. prakt. Chem. 135, 275 (1932)] obtained it in small yield from the action of benzylmagnesium chloride on quinoline, 2-benzylquinoline being the main product. In addition, Bergstrom [J. Org. Chem. 11, 55 (1946)] reported its preparation in 37% yield by the action of chlorobenzene on lepidime in the presence of potassium amide in liquid ammonia. Now, by our above-described method, it is possible to obtain this compound, as well as other 4-arylmethylquinolines, in excellent yields.

Our invention also comprehends a particular group of 4-arylmethylquinolines bearing halogen atoms in the benzene portion of the quinoline nucleus. These compounds have the general formula

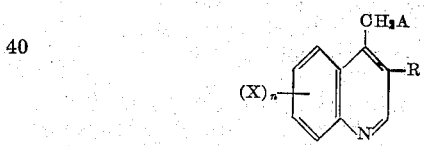

where A is defined as above, R is hydrogen, methyl, halogen or nitro, X is a halogen atom and n is 1 to 2, inclusive. X comprehends chloro, bromo, iodo and fluoro. These 4-arylmethyl-halogenated-quinolines have useful parasiticidal properties, such as fungicidal activity. Illustrative of these compounds are the following: 4-(3,4-dichlorobenzyl)-7,8-dichloroquinoline; 3-methyl-4-(3,4-dimethoxybenzyl)-8-iodoquinoline; 4-benzyl-7-chloroquinoline; 4-(4-chlorobenzyl)-7-fluoroquinoline; 3-nitro-4-benzyl-5,7-dichloroquinoline; 4-benzyl-3,7-dichloroquinoline; 3-methyl-4-benzyl-6-bromoquinoline; 4-benzyl-6,8-dichloroquinoline; 3-iodo-4-(3,4-dibromobenzyl)-5-chloroquinoline; and the like.

Also encompassed within the scope of our invention are 4-arylmethyl-halogenated-quinolines in the form of their acid addition salts with non-toxic inorganic or organic acids, such as hydrochloric acid, sulfuric acid, phosphoric acid, hydrobromic acid, hydroiodic acid, sulfamic acid, tartaric acid, citric acid, benzoic acid, and the like.

The following examples will further illustrate specific embodiments of our invention.

4-arylmethylquinolines

These 4-substituted-quinolines were prepared by heating the related alpha-aryl-alpha-(4-quinolyl)acetonitriles in an acidic medium. Illustrative of various reaction conditions suitable for the process of our invention are the following procedures: Five parts by weight of an alpha-aryl-alpha-(4-quinolyl)acetonitrile.

[ACH(Q)CN]

and eight parts by volume each of concentrated sulfuric acid and water were refluxed vigorously for one hour. Initially, carbon dioxide evolves in copious amounts. At the end of the heating period, the yellow solution was poured into a mixture of ice and excess ammonium hydroxide. The product which separated was taken up in a solvent such as ether, the extract dried over anhydrous calcium sulfate, and the solvent distilled to give a quantitative yield of pale yellow oil which solidified on standing. Recrystallization from petroleum ether gave the purified crystalline 4-arylmethylquinoline.

In another preparation a solution of 5 g. of alpha-phenyl-alpha-(7-chloro-4-quinolyl)acetonitrile, 8 ml. of concentrated sulfuric acid, 2 ml. of water, and 15 ml. of methanol was refluxed for 22 hours on a steam bath. Working up of the reaction mixture as described in the preceding paragraph yielded a quantitative yield of the crude 7-chloro-4-benzylquinoline, which when recrystallized from petroleum ether, melts at 93.5°–94° C.

Another means of preparing said 4-arylmethylquinolines of the formula $ACH_2Q$ is illustrated by the following preparation of 7-chloro-4-benzylquinoline: Hydrogen chloride was passed for eight hours into a refluxing solution of 5 g. of alpha-phenyl-alpha-(7-chloro-4-quinolyl)acetonitrile dissolved in 50 ml. of absolute ethanol. The solution was filtered while hot to remove the ammonium chloride which had separated, the filtrate cooled, 20 ml. of ether added, and after standing two days the white solid which separated was filtered. The product obtained was 4 g. of impure 7-chloro-4-benzylquinoline hydrochloride, M. P. 218°–220° C. (with decomposition), the structure of which was confirmed by converting into the corresponding 7-chloro-4-benzylquinoline, which has properties identical with the compound the preparation of which was described in the above paragraph.

Other 4-benzylquinolines prepared according to the above procedures from the related alpha-phenyl-alpha-(4-quinolyl)-acetonitrile include: 4-benzylquinoline, M. P. 52°–52.5° C. and mono-sulfate salt thereof, M. P. 195°–196° C.; 5-chloro-4-benzylquinoline, M. P. 48.6°–49.2° C. (corr.).

Using other alpha-aryl-alpha-(4-quinolyl)acetonitriles in the above procedures the following 4-arylmethylquinolines can be obtained: 4-(3,4-dichlorobenzyl)-7,8-dichloroquinoline; 4-(4-chlorobenzyl)-6,8-dichloroquinoline; 3-methyl-4-(3,4-dimethoxybenzyl)-8-iodoquinoline; 4-benzyl-7-bromoquinoline; 4-(4-chlorobenzyl)-7-fluoroquinoline; 3-nitro-4-benzyl-5,7-dichloroquinoline; 3-nitro-4-(3,4-dichlorobenzyl)quinoline; 4-benzyl-3,7-dichloroquinoline; 6-methoxy-4-(4-methoxybenzyl)-quinoline; 3-methyl-4-benzyl-6-bromoquinoline; 4-benzyl-6,8-dichloroquinoline; 3-iodo-4-(3,4-dibromobenzyl)-5-chloroquinoline; and the like.

The structure of our 4-arylmethyl-halogenated-quinolines follows from the mode of preparation, that is, by heating the corresponding alpha-aryl-alpha-(halogenated-4-quinolyl)acetonitriles to completely remove the CN group, and from the fact that similarly heating alpha-phenyl-alpha-(4-quinolyl)acetonitrile yields the known 4-benzylquinoline shown above.

Our 4-arylmethyl-halogenated-quinolines were found to have fungicidal and fungistatic activity when tested against various fungi, for example, *Trichophyton interdigitale*, *Trichophyton mentagrophytes*, and *Trichophyton gypseum*; these are fungal organisms which cause dermatomycoses or mold infections of human and animal skin, or, as they are commonly called, ringworm infections, such as ringworm of the foot (athlete's foot), tinea sycosis in the horse, cow, dog, and sometimes in man. This antifungal activity was determined according to the following procedure: Spore suspensions were prepared from 15 day old cultures of the test organism grown in maltose peptone broth. The mats were shaken with glass beads, the resulting suspensions diluted and filtered through a 200 mesh Monel metal screen. This filtered spore suspension was then diluted 1 to 10 with maltose peptone broth and 1 cc. of this dilution added to inoculate each of the culture tubes used in the test. An aqueous-ethanolic stock solution was prepared by dissolving the compound to be tested in N/1.HCl, diluting with aqueous-ethanol (about 15 to 50% ethanol), and then adding water to produce a solution containing 0.5 mg. per ml. of the compound to be tested; the pH of this solution was then adjusted to about 5.6 to 6.3 with N/1.NaOH. Working dilutions of the compound being tested were then prepared from this aqueous-alcohol stock solution by dilution with maltose peptone broth. Inoculated tubes of medicated medium were incubated for 10 days at 25° C. to determine the fungistatic end-points, that is, the maximum effective dilution to stop fungal growth. All tubes showing no growth after 10 days were subcultured (0.1 cc. to 10 cc.) in maltose peptone broth and incubated at 25° C. for an additional 10 days to determine the fungicidal end-points, that is, the maximum effective dilution to kill the fungus. Illustrative of the anti-fungal activity of our compounds when tested according to the above-described procedure are the activities of the 5-chloro-4-benzylquinoline and 7-chloro-4-benzylquinoline as presented in the following table.

| Fungus | Maximum Effective Dilution | | | |
| --- | --- | --- | --- | --- |
| | 5-Chloro-4-benzyl-quinoline [a] | | 7-Chloro-4-benzyl-quinoline [b] | |
| | Fungistatic Dilution | Fungicidal Dilution | Fungistatic Dilution | Fungicidal Dilution |
| *T. interdigitale* | 1:20,000 | 1:20,000 | 1:20,000 | 1:20,000 |
| *T. mentagrophytes* | 1:40,000 | <1:10,000 | 1:20,000 | 1,10,000 |
| *T. gypseum* | 1:40,000 | 1:40,000 | 1:20,000 | 1:20,000 |

[a] Stock solution contained about 7% ethanol and had a pH of 5.65.
[b] Stock solution contained about 35% ethanol and had a pH of 6.25.

Our 4-arylmethyl-halogenated-quinolines are preferably administered topically; and they can be compounded with conventional excipients and administered in the form of a powder, a liquid, a salve, an ointment, an aerosol, or any other convenient vehicular form suitable for administering anti-fungal agents. Our quinolines can be formulated in these various vehicular forms in dilutions of about 1:1000 to about 1:20,000.

We claim:

A process for the preparation of a 4-arylmethylquinoline having the formula $ACH_2Q$, where A is a monocyclic radical of the benzene series and Q is a 4-quinolyl radical, which comprises heating an alpha-aryl-alpha-(4-quinolyl)acetonitrile having the formula ACH(Q)CN in an acidic medium.

References Cited in the file of this patent

UNITED STATES PATENTS 2,568,778    Surrey et al.    Sept. 25, 1951

UNITED STATES PATENT OFFICE

CERTIFICATE OF CORRECTION

Patent No. 2,838,514 June 10, 1958

Alexander R. Surrey et al.

It is hereby certified that error appears in the above numbered patent requiring correction and that the said Letters Patent should read as corrected below.

Column 1, line 54, for "in ge-" read -- is ge-"; column 2, line 53, for "4-(4-chlorobenzyl-7-" read 4-(4-chlorobenzyl)-7- --.

Signed and sealed this 19th day of August 1958.

(SEAL)
Attest:
KARL H. AXLINE

Attesting Officer

ROBERT C. WATSON
Commissioner of Patents